US009801002B2

(12) United States Patent
Foti (10) Patent No.: US 9,801,002 B2
(45) Date of Patent: Oct. 24, 2017

(54) METHOD AND APPARATUS FOR IDENTIFYING APPLICATION INSTANCES WITHIN A MACHINE-TO-MACHINE NETWORK DOMAIN

(71) Applicant: Telefonaktiebolaget L M Ericsson (publ), Stockholm (SE)

(72) Inventor: George Foti, Dollard des Ormeaux (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 585 days.

(21) Appl. No.: 14/090,964

(22) Filed: Nov. 26, 2013

(65) Prior Publication Data

US 2015/0149633 A1 May 28, 2015

(51) Int. Cl.
*H04W 4/00* (2009.01)
*G06F 15/173* (2006.01)
(Continued)

(52) U.S. Cl.
CPC ...... *H04W 4/006* (2013.01); *G06F 15/17337* (2013.01); *H04L 41/04* (2013.01);
(Continued)

(58) Field of Classification Search
CPC ... H04W 4/005; H04W 4/006; H04W 76/021; H04L 41/04; H04L 67/30; H04L 67/32; H04L 67/2809
See application file for complete search history.

(56) References Cited

U.S. PATENT DOCUMENTS 8,316,420 B2 11/2012 Buchwald et al.
9,215,736 B2 * 12/2015 Foti ..................... H04W 76/021
(Continued)

FOREIGN PATENT DOCUMENTS

WO 2005004436 A1 1/2005
WO 2007110468 A1 10/2007
(Continued)

OTHER PUBLICATIONS

Pareglio, Ericsson, "Overview of ETSI M2M Architecture", ETSI, Oct. 2011.*
(Continued)

*Primary Examiner* — Ramy M Osman
(74) *Attorney, Agent, or Firm* — Murphy, Bilak & Homiller, PLLC (57) ABSTRACT

In one aspect of the teachings herein, a Services Capability Layer, SCL, within a Machine-to-Machine, M2M, network generates unique identifiers, for use in identifying individual application instances within the M2M domain. According to such operation, an SCL receives or otherwise obtains an application identifier for an application instance registering at the SCL, and generates a globally unique identifier for the application instance using the application identifier or an alias corresponding to it. As an example, the SCL appends to the application identifier or alias its own identifier, which is unique to that SCL, along with a random value. The resultant identifier is guaranteed to be unique for the individual application instance and the SCL uses the resultant identifier for identifying the application instance to other entities within the M2M domain.

17 Claims, 5 Drawing Sheets (51) Int. Cl.
*H04L 29/08* (2006.01)
*H04L 12/24* (2006.01)
*H04W 76/02* (2009.01)

(52) U.S. Cl.
CPC .......... *H04L 67/2809* (2013.01); *H04L 67/30* (2013.01); *H04L 67/32* (2013.01); *H04W 4/005* (2013.01); *H04W 76/021* (2013.01)

(56) References Cited

U.S. PATENT DOCUMENTS

| | | | | |
|---|---|---|---|---|
| 9,307,040 | B2* | 4/2016 | Tyagi | H04L 67/2809 |
| 9,490,990 | B2* | 11/2016 | Foti | H04W 4/005 |
| 9,560,162 | B2* | 1/2017 | Foti | H04L 63/0281 |
| 2005/0091388 | A1 | 4/2005 | Kamboh et al. | |
| 2009/0133100 | A1* | 5/2009 | Buchwald | G06F 21/6218 726/3 |
| 2013/0028411 | A1* | 1/2013 | Arkko | H04L 9/0833 380/28 |
| 2013/0066965 | A1 | 3/2013 | Foti et al. | |
| 2013/0188515 | A1* | 7/2013 | Pinheiro | H04W 4/001 370/254 |
| 2013/0297744 | A1* | 11/2013 | Foti | H04L 67/327 709/219 |
| 2013/0308566 | A1* | 11/2013 | Foti | H04W 4/005 370/329 |
| 2013/0310027 | A1 | 11/2013 | Foti et al. | |
| 2013/0343231 | A1* | 12/2013 | Foti | H04W 4/005 370/259 |
| 2014/0189001 | A1* | 7/2014 | Tyagi | H04W 4/005 709/204 |
| 2014/0189075 | A1* | 7/2014 | Stansell | G06F 9/546 709/220 |
| 2015/0149633 | A1* | 5/2015 | Foti | H04W 4/005 709/226 |
| 2016/0182297 | A1* | 6/2016 | Dauneria | H04W 4/005 709/224 |

FOREIGN PATENT DOCUMENTS

| | | |
|---|---|---|
| WO | 2013036697 A3 | 3/2013 |
| WO | 2013051770 A1 | 4/2013 |

OTHER PUBLICATIONS

Matsuo, T., "Deploying the Application to the Cloud," https://developers.google.com/appengine/training/cloud-sql/deploy_the_app. Jun. 2013.

* cited by examiner

METHOD AND APPARATUS FOR IDENTIFYING APPLICATION INSTANCES WITHIN A MACHINE-TO-MACHINE NETWORK DOMAIN

TECHNICAL FIELD

The present invention generally relates to machine-to-machine, M2M, networks, and particularly relates to identifying application instances within such domains.

BACKGROUND

Machine-to-machine or M2M networks commonly include a number of M2M applications running on any number of devices and/or application servers, which are communicatively interconnected and form an M2M domain. There may be a large plurality of devices operating within the network and there may be a variety of device types. For example, smart metering or monitoring networks may include geographically diverse sets of smart water or electric meters, M2M-enabled vending machines, etc.

The European Telecommunications Standards Institute or ETSI provides a number of reference standards for M2M networks and their operation. For an overview of broad architectural and functional aspects, the interested reader is referred to TS 102 690, which is titled "Machine-to-Machine communications (M2M); Functional architecture." Examples of other references of interest includes TS 102 921, "Machine-to-Machine communications (M2M); mIa, dIa and mId interfaces"; TR 102 725, "Machine-to-Machine communications (M2M); Definitions"; TS 103 092, "Machine-to-Machine communications (M2M); OMA DM compatible Management Objects for ETSI M2M"; TR 102 935, "Machine-to-Machine communications (M2M); Applicability of M2M architecture to Smart Grid Networks; Impact of Smart Grids on M2M platform"; and TR 102 691, "Machine-to-Machine communications (M2M); Smart Metering Use Cases".

Within the M2M domain, so called "service capability layers" or SCLs provide a number of defined functions, for supporting communications, control and data sharing within the M2M domain. Among the various services and functions, SCLs provide for registration of M2M applications local to the SCL, authentication and authorization of SCL communications, charging records generation, storage of application data and histories, analysis and forwarding of methods and data according to defined policies, managing collections of resources and their attributes, managing subscriptions and notifications pertaining to data changes, maintaining reachability information for the M2M entities associated with data, collections, and registrations at the SCL, support of information groupings for M2M gateways, M2M devices and M2M applications, along with configuration management, fault management, etc. SCLs also may support interworking with non-ETSI compliant devices and gateways and may support interworking using Core Network, CN, services provided by a Public Land Mobile Network, PLMN, operator, for M2M devices and applications that access the M2M network through a cellular or other such wireless access network.

Consider, for example, the registration of an M2M application—hereafter the "M2M" designation shall be assumed without explicit use—with an SCL. Depending on where the application resides, the SCL may be at the device level, the gateway level, or the network level. Correspondingly, device-level SCLs are referred to as "D-SCLs," gateway-level SCLs are referred to as "G-SCLs," and network-level SCLs are referred to as "N-SCLs." According to defined hierarchy, there may be many D-SCLs and/or G-SCLs within a given M2M network, but only one N-SCL.

In any case, any instance of an application that registers with its local SCL must be uniquely identifiable to the SCL and, more broadly, to other entities within the M2M network. Unfortunately, application developers as a rule do not provide for uniquely identifying individual instances of their applications. For example, all instances of a given smart metering application may use the same generic application identifier, at least with respect to a given build or version of the application. Here, an "application instance" will be understood as an executing copy of a given application. For example, a device may store an M2M application program and each time the program is launched and run represents a new instantiation of the program.

There may be a large number of devices within the network running exactly the same build or version of the smart metering application, indeed, individual devices may run multiple instances of the same application, or may invoke repeated instances of the same application on a periodic or triggered basis. Consequently, a given SCL may receive non-unique application identifiers for any number of registering application instances, thus complicating the registration process and further complicating broader identification of individual application instances within the involved M2M domain.

SUMMARY

In one aspect of the teachings herein, a Services Capability Layer, SCL, within a Machine-to-Machine, M2M, network generates unique identifiers, for use in identifying individual application instances within the M2M domain. According to such operation, an SCL receives or otherwise obtains an application identifier for an application instance registering at the SCL, and generates a globally unique identifier for the application instance using the application identifier or an alias corresponding to it. As an example, the SCL appends to the application identifier or alias its own identifier, which is unique to that SCL, along with a random value. The resultant identifier is guaranteed to be unique for the individual application instance and the SCL uses the resultant identifier for identifying the application instance to other entities within the M2M domain.

In an example embodiment, a node hosting an SCL within an M2M domain implements a method of providing for unique identification of application instances within the M2M domain. The method includes receiving an application identifier from an application instance, in association with registration of the application instance at the SCL, and generating an application instance identifier that is globally unique within the M2M domain. The application instance identifier is based on the received application identifier, an SCL identifier predefined for identifying the SCL within the M2M domain, and a random value. The method further includes binding the application instance identifier to the application instance at the SCL in a unique way and identifying the application instance within the M2M domain via the application instance identifier.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
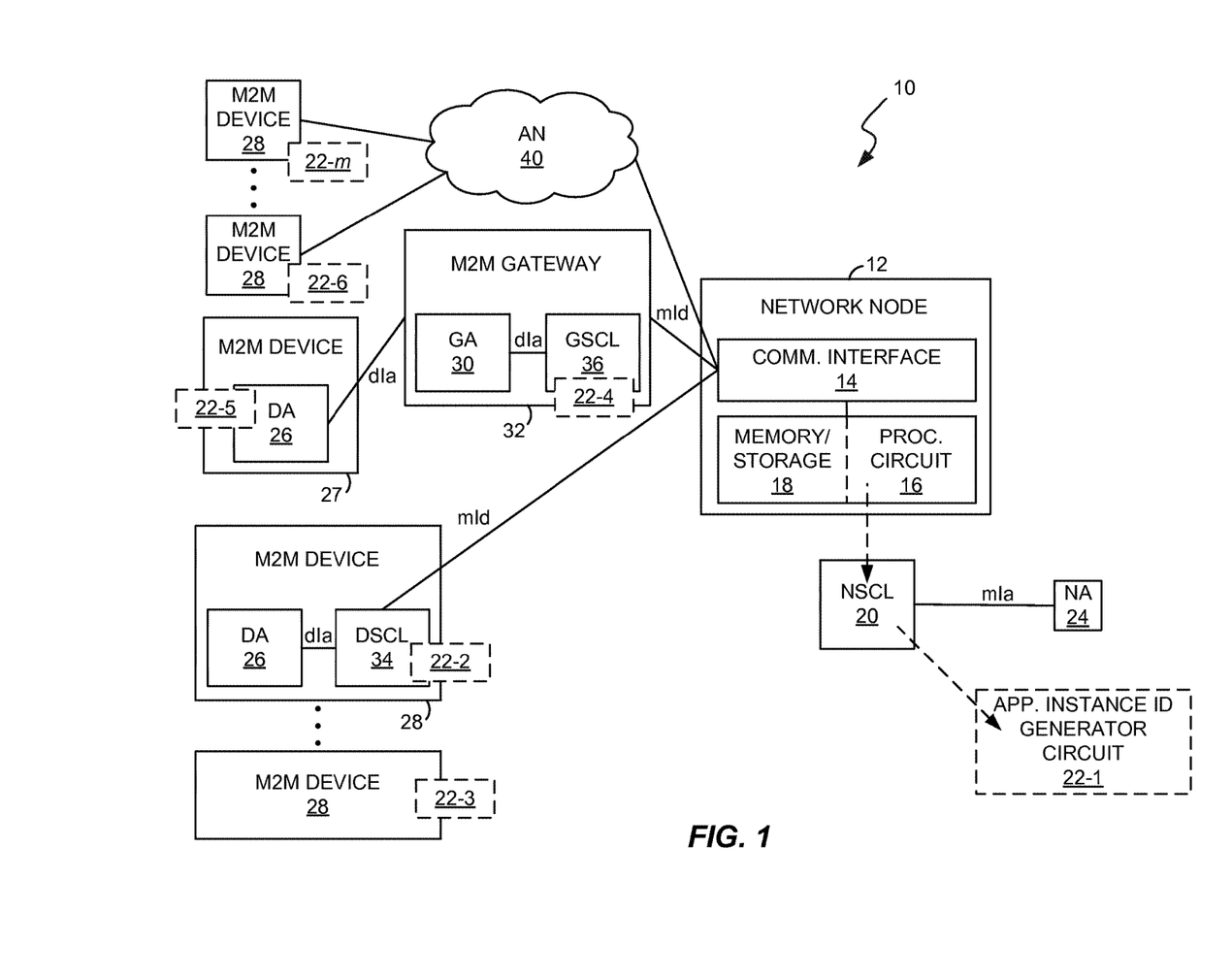
FIG. 1 is a block diagram of one embodiment of a Machine-to-Machine, M2M, network domain, which includes one or more network nodes hosting Service Capability Layers or SCLs, which are configured to perform application instance identification as taught herein.

FIG. 1 illustrates a Machine-to-Machine, M2M, domain comprising an M2M network 10 that includes a network node 12 having a communication interface 14, a processing circuit 16, and memory/storage 18. The network node 12 hosts a Network Services Capability Layer, N-SCL, 20 that in one or more example embodiments implements a generator circuit 22-1, which is configured to generate unique application instance identifiers according to the teachings herein.

Further details of interest include the depiction of device applications or DAs 26, which may be hosted on M2M devices 27 and 28, and gateway applications or GAs 30, which are hosted on an M2M gateway 32. There may be any number of M2M devices 27 and/or any number of M2M devices 28 and the reference number distinction is made to indicate that M2M devices 28 host their own Device SCLs, D-SCLs 34, while the device applications 26 instantiated in the M2M device(s) use a Gateway SCL or G-SCL 36, as implemented in their associated gateway(s) 32. One also sees that at least some devices 28 may connect directly to the network node 12/N-SCL 20, while other devices 28 connect through an Access Network or AN 40, such as a wireless communication network, which may or may not be owned and operated by the same entity that owns and operates the M2M network 10.

FIG. 1 also illustrates additional examples of the generator circuit 22, shown as generator circuits 22-2, 22-3 in given ones of the example devices 28, a generator circuit 22-4 in the example gateway 32, a generator circuit 22-5 in the example device 27, and additional generator circuits 22-6 through 22-m in the additional example devices 28 that connect through the AN 40. Of course, the illustration is a non-limiting example. All of the generator circuits 22 depicted may be implemented, or it may be that only one of them or some of them are implemented. The point is that a generator circuit 22 is implemented at one or more of the SCLs at issue in the network 10, but not necessarily at all SCLs, or necessarily at all hierarchies of SCLs.

Figure 2:
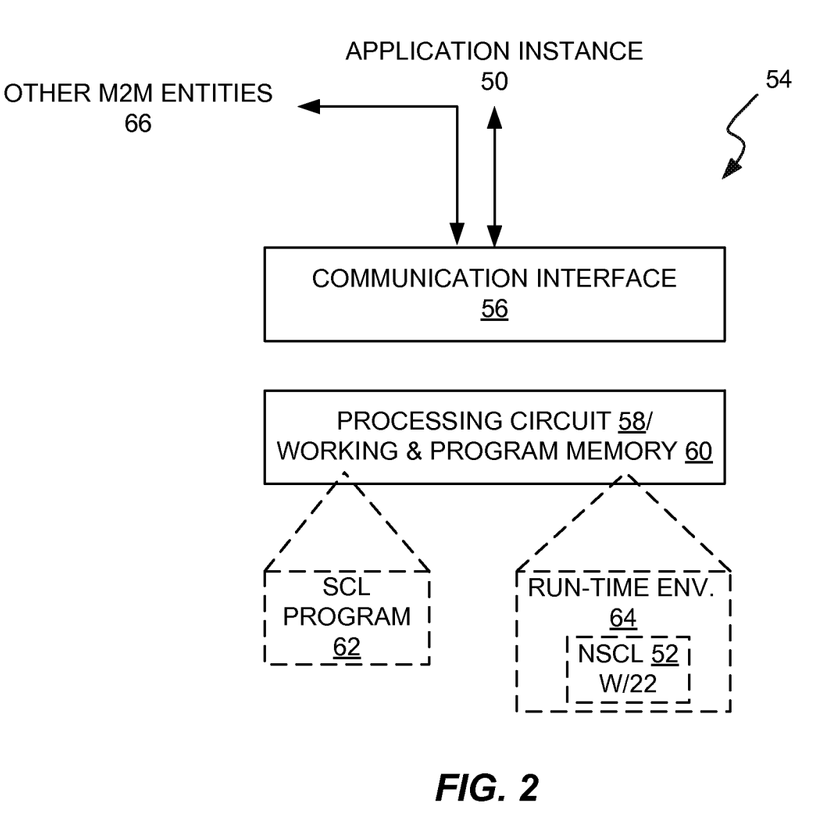
FIG. 2 is a block diagram of one embodiment of an M2M network node configured to provide for globally unique application instance identifiers within an M2M domain.

For ease of discussion, then, FIG. 2 illustrates an application instance 50 that communicates with an SCL 52 that implements a generator circuit 22 according to the teachings herein. The SCL 52 is hosted in a node 54 within the M2M network domain, where the node 54 includes a communication interface 56, a processing circuit 58, and working/program memory 60. In an example implementation, execution of an SCL program 62 by the processing circuit 58 instantiates or otherwise provides a run-time environment 64 in which the SCL 52 is instantiated and executed. The SCL 52 communicates with other M2M entities 66 within the M2M domain via signaling through the communication interface 56.

The node 54 is meant to generically represent any node within the M2M domain that hosts an SCL. In one example, the node 54 is a device 28 and the SCL 52 is a D-SCL 34 hosted on the device 28. In another example, the node 54 is a gateway 32 and the SCL 52 is a G-SCL 36 hosted on the gateway 32. In yet another example, the node 54 is the network node 12 shown in FIG. 1 and the SCL 52 is the N-SCL 20. It will therefore be appreciated that the particular circuitry represented by the communication interface 56 and the processing circuit 58 will change in dependence on the type of node represented by the node 54.

However, in a general example, the processing circuit 58 comprises one or more microprocessor circuits, DSP circuits, or other digital processing circuitry that is specially adapted to carry out the processing operations disclosed herein for application instance identifier generation, based at least in part on the execution of the computer program instructions comprising the SCL program 62. The working/program memory 60 will therefore be understood in an example embodiment as comprising a computer-readable medium storing the SCL program 62 on a persistent, non-transitory basis. As a non-limiting example, the working/program memory 60 includes any one or more of FLASH-based storage, EEPROM-based storage, Solid State Disk storage, and electromagnetic disk storage.

In an example where the node 54 is one of the devices 28, the communication interface 56 comprises a wired or wireless interface that is adapted for sending and receiving M2M signaling, e.g., under control of the processing circuit 58. In a scenario where the device 28 communicates with the M2M network 10 through the AN 40, the communication interface 56 includes a radio transceiver that is adapted according to the Radio Access Technology, RAT, and signaling protocols used by the air interface provided by the AN 40. In such cases, the M2M signaling may be encapsulated for conveyance through the AN 40, or is tunneled through the AN 40. In general, the communication interface 56 may include more than one communication interface, e.g., radio, wired, etc.

With the above in mind, the node 54 is configured for operation in an M2M network domain 10 and the communication interface 56 is configured to communicatively couple the SCL 52, as hosted by the node 54, with one or more other M2M entities 66 within the M2M domain 10. In turn, the processing circuit 58 is operatively associated with the communication interface 56 and is configured to instantiate the SCL 52 at the node 54, so that the SCL 52 provides for unique identification of application instances 50 within the M2M domain 10. In this regard, the processing circuit 58 is configured to obtain an application identifier for an application instance 50, in association with registration of the application instance 50 at the SCL 52, and to generate an application instance identifier that is globally unique within the M2M domain 10.

The application instance identifier is generated based on the application identifier, an SCL identifier predefined for identifying the SCL 52 within the M2M domain 10, and a random value, and the processing circuit 58 is further configured to uniquely bind the application instance identifier to the application instance 50 at the SCL 52. The processing circuit 58 is further configured to identify the application instance 50 within the M2M domain 10 via the application instance identifier. These configurations of the processing circuit 58 may be realized, e.g., according to its programmatic configuration, such as where the SCL program 62 includes program instructions that imbue the SCL 52 with such functionality, when executed by the processing circuit 58.

In an example scenario, the application instance 50 is an instance of a given M2M application, and the application identifier is generic to any instance of that given M2M application. That is, any instance of the application reports or provides the same, non-unique application identifier when registering with an SCL. In such scenarios, the SCL 52 "obtains" the application identifier from the application instance 50—e.g., the application instance 50 is hosted on some device or node and causes that node to send signaling to the node 54 that contains the application identifier, which is received via the communication interface 56 and processed via the processing circuit 58 within the framework of overall SCL processing.

In another example, a generic application identifier may be known a priori at the SCL 52 for a potentially large plurality of application instances 50, e.g., where the SCL 52 supports a known, predefined type of application, such as smart metering for electric, gas or water consumption. In such cases, the application identifier is "obtained" from configuration information or other stored data accessible to the SCL 52.

However the application identifier for a given application instance 50 is obtained, in one approach contemplated herein for unique identifier generation, the processing circuit 58 is configured to generate the application instance identifier by appending its SCL identifier and a random value to the application identifier, or to an alias corresponding to the application identifier. That is, while in some instances it may be convenient or desirable to form the unique application instance identifier from the corresponding application identifier, in other scenarios it may be convenient or desirable to use an alias for the application identifier and form the unique application instance identifier based on the alias. As merely one example, the alias may be a defined-length string formed by shortening or lengthening the application identifier, as needed, to obtain a string of the defined length.

In a specific but non-limiting example, the processing circuit 58 is configured to generate the application instance identifier by deriving the application instance identifier from the application identifier, the SCL identifier and the random value. Here, "deriving" encompasses forming the application instance identifier directly from the application identifier, but further encompasses forming the application instance identifier based on hashing or otherwise manipulating the application identifier and/or based on a corresponding alias or a processed version of such an alias.

In another example, the processing circuit 58 is configured to include in the application instance identifier one or more data items that were provided by the application instance 50, e.g., as part of registration signaling. In at least one embodiment, the one or more data items comprise at least one of: an equipment identifier identifying an item of equipment on which the application instance 50 is running; and an operator identifier identifying a user of the equipment on which the application instance 50 is running. Here, the "user" may be a human operator, e.g., an individual member of a gym that includes exercise equipment that uses M2M applications to track workout information for individual members. In other instances, the "user" is a non-human machine entity, e.g., another M2M entity within the M2M domain—here, "entity" means anything within the M2M network domain 10 that has an M2M identity, e.g., applications, SCLs, devices, nodes, etc.

In that regard, the processing circuit 58 is configured to identify the application instance 50 within the M2M domain 10 via the application instance identifier generated for the application instance 50, by using the application instance identifier to publish or otherwise announce the registration of the application instance 50 at the SCL 52, to one or more other M2M entities 66 in the M2M domain 10. These other entities 66 include, by way of non-limiting example, any M2M entities 66 that are registered or otherwise announced at the SCL 52.

The above advantageous processing is performed by the processing circuit 58 with respect to individual application instances 50, which shall be understood as including multiple instantiations of the same application program by the same device or node. That is, the processing circuit 58 is configured to generate a new application instance identifier that is globally unique within the M2M domain 10, for each subsequent registration of a new application instance 50 for any given application. Thus, in an example case where a given M2M device 27 or 28 periodically instantiated a given M2M application 26, and where each instantiation involved a registration or re-registration following a de-registration, of each such application instance 50, the processing circuit 58 would generate a unique application instance identifier for each such instance.

Figure 3:
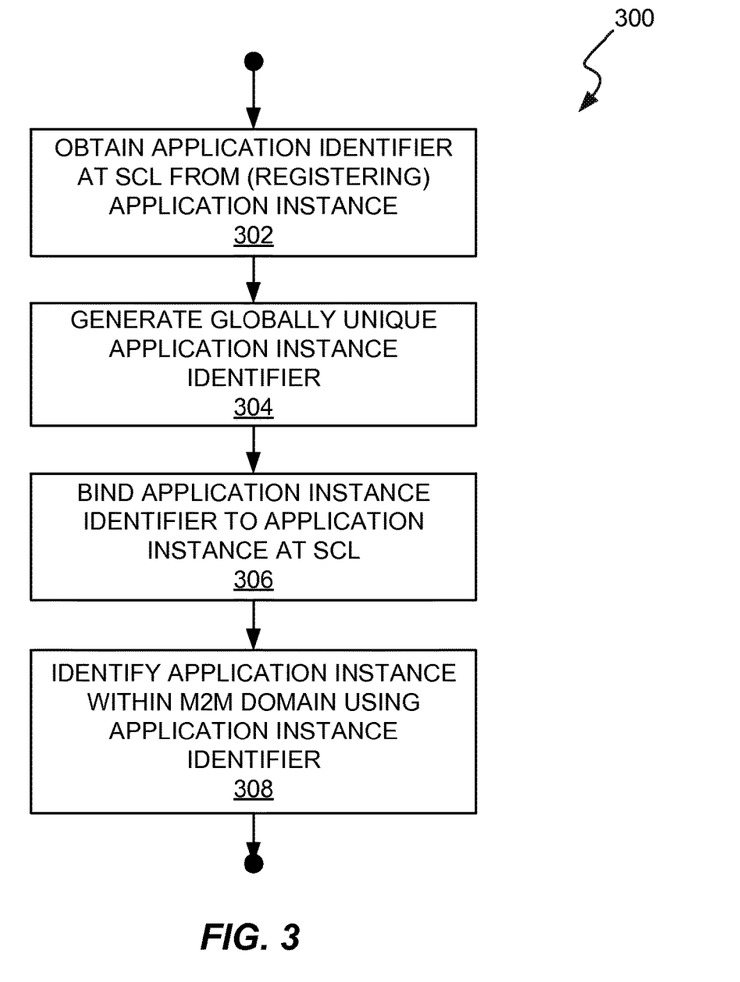
FIG. 3 is a logic flow diagram of one embodiment of a method of providing for globally unique application instance identifiers within an M2M domain.

FIG. 3 illustrates a method 300 corresponding to the above teachings and it will be understood that the method 300 may be performed, by way of non-limiting example, based on the node 54 of FIG. 2 executing the computer program instructions comprising the SCL program 62. It will also be appreciated that one or more of the processing operations illustrated in FIG. 3 may be performed in an order other than that suggested by the logic flow diagram. Still further, it will be appreciated that the method 300 may be performed as part of a larger set of processing operations and may be performed serially or concurrently with respect to a plurality of individual application instances 50.

The method 300 provides for unique identification of application instances 50 within an M2M domain 10 and includes obtaining (Block 302) an application identifier for an application instance 50, in association with registration of the application instance 50 at the SCL 52. The method 300 further includes generating (Block 304) an application instance identifier that is globally unique within the M2M domain 10, based on the received application identifier, an SCL identifier predefined for identifying the SCL 52 within the M2M domain 10, and a random value. Still further, the method 300 includes uniquely binding (Block 306) the application instance identifier to the application instance 50 at the SCL 52, and identifying (Block 308) the application instance 50 within the M2M domain 10 via the application instance identifier.

Figure 4:
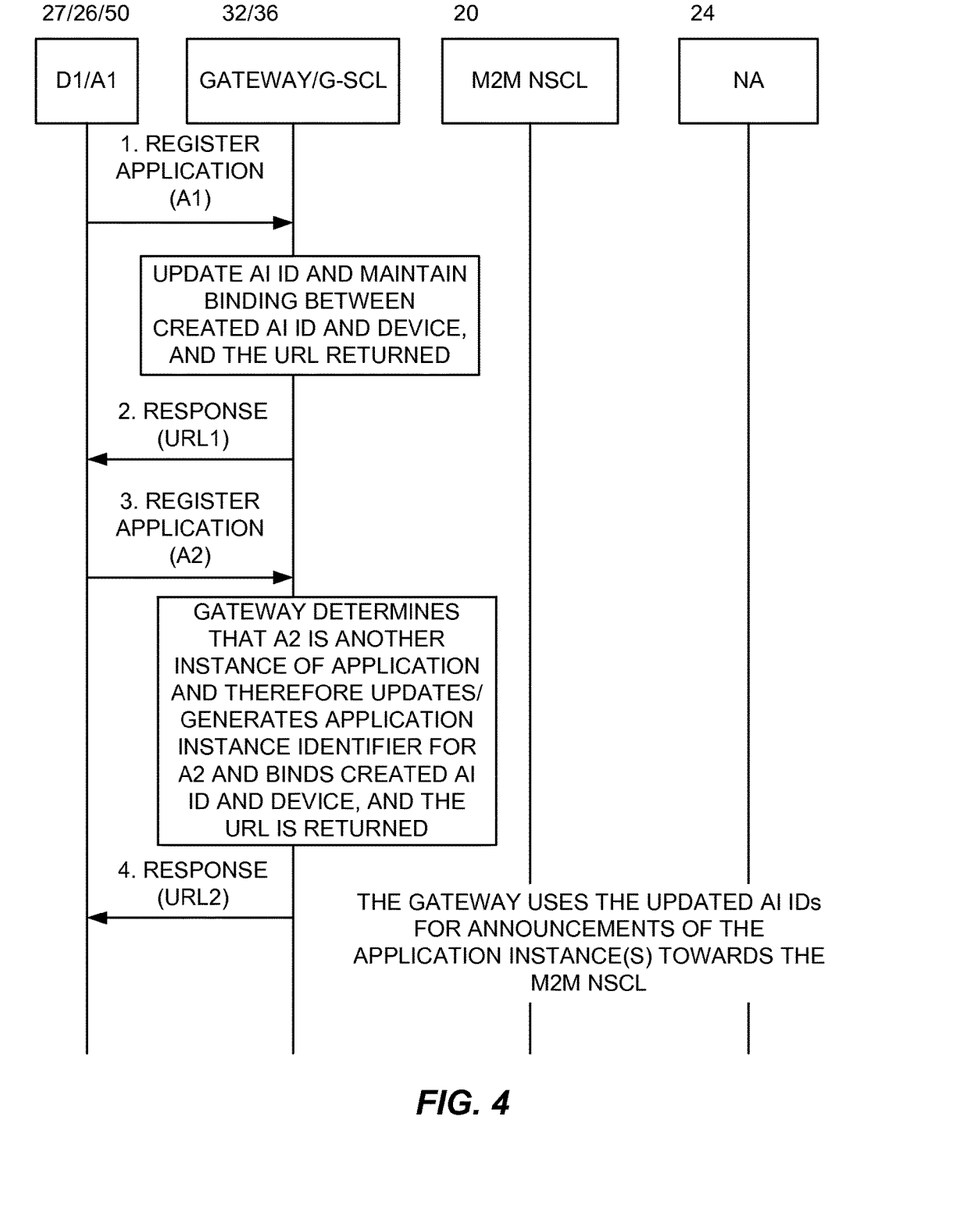
FIGS. 4 and 5 are signal flow diagrams of example signaling embodiments, for generating and using globally unique application instance identifiers within an M2M domain.

FIG. 4 illustrates an example signal flow according to one embodiment of the teachings presented herein. In the context of FIG. 4, a gateway 32 includes a G-SCL 36 that is configured to generate unique application instance identifiers, e.g., the gateway 32/G-SCL 36 implement a generation circuit 22. Further, an M2M device 27 hosts an M2M device application 26, and an instance 50 of that application sends registration signaling towards the G-SCL 36 at Step 1. Here, the application instance 50 is denoted as "A1" in the diagram.

In response, the G-SCL 36 generates an application instance identifier and uniquely binds it to the application instance 50, and to the host device 27, and returns Uniform Resource Locator, URL, information to A1 at Step 2. At Step 3, which occurs some indeterminate time later, another instance 50 of the same application 26 sends registration signaling towards the G-SCL 36, where this second instance 50 is denoted as "A2" in the diagram. The instance 50 denoted as A1 may or may not still be registered at the G-SCL 36—i.e., the device 26 may or may not be running instance A1 concurrently with A2. In any case, the G-SCL 36 determines that A2 is another instance of the application 26 and therefore updates application instance identifier information at the G-SCL 36—i.e., it generates a new unique application instance identifier for A2, which is distinct from the identifier generated for A1, and sets the appropriate bindings, etc. At Step 4, URL information for A2 is returned to A2, which is denoted as URL2 in the diagram.

Figure 5:
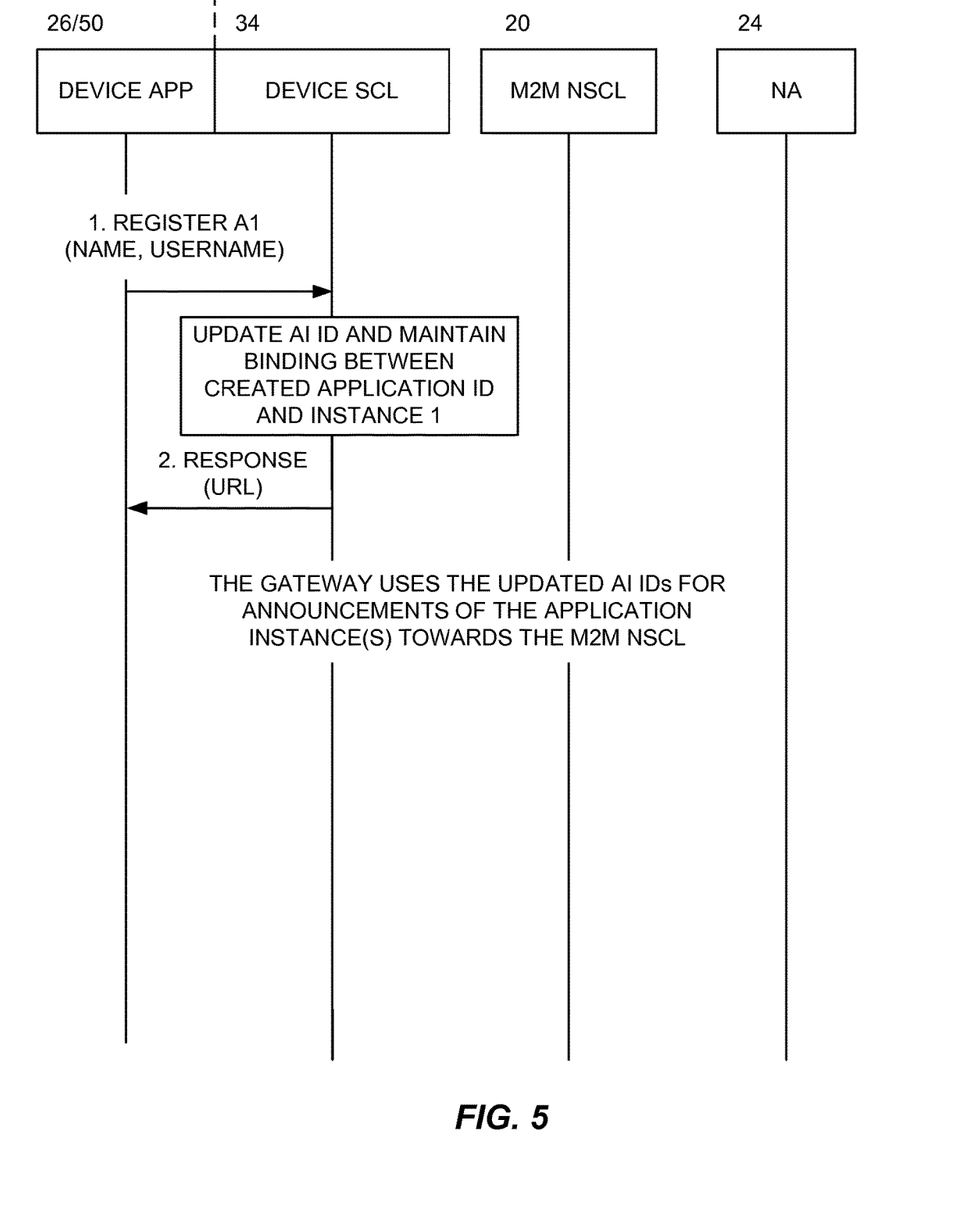

FIG. 5 is similar, except that it depicts a device SCL or D-SCL 34 that is configured to generate unique application instance identifiers for instances 50 of the device applications or DAs 26 local to the device hosting the D-SCL 34. FIG. 5 also indicates the example case where the registration signaling at Step 1 includes a generic application name and further includes a user name or other user-specific information. The D-SCL generates a unique application instance identifier for the "A1" application instance 50, sets up the appropriate bindings, saves or otherwise uses the received user information and returns URL information to A1. The D-SCL 34 uses the application instance identifier it generated for A1, to identify A1 to other entities within the M2M domain 10, e.g., to an N-SCL 20.

These illustrations can be understood as non-limiting examples of an approach taught herein, whereby the M2M identifiers used in an M2M domain 10 for individual application instances 50 are in some sense "wild-carded." In other words, the application instance identifier used for an individual application instance 50 may be considered as having two parts: a fixed part and a variable part. The fixed part may be wholly generic, e.g., a non-unique application ID or number associated with all instances 50 of the same application type or version. Conversely, the variable part is dynamically generated by the SCL with which the application instance 50 is registering. The dynamic generation is configured to ensure global uniqueness of the resultant application instance identifier within the M2M domain 10.

The two parts may be separated by a reserved character such as a hyphen or anything that can be parsed or otherwise recognized. The variable part includes, for example, the ID of the SCL and a random value generated by the SCL. Additionally, the variable part may include user data received from the application instance 50, such as user name, telephone number, etc.

For an application that can execute multiple instances 50 on the same physical device or node, which is not associated with a specific user, the variable part can be any random value—random characters or numbers—with an incrementally sequential part for every new instance of the same application, which can be concatenated to the fixed part. For example, applicationID1-instance1, applicationID1-instance2, where applicationID1 is the fixed part and instance1 and instance2 are the variable parts. Note that at G-SCLs 36, the G-SCL 36 has to bind these uniquely generated application instance identifiers with the application instances 50, and to extend those bindings to the corresponding applications and devices hidden by the hosting gateway 32.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method at a node hosting a Services Capability Layer, SCL, within a Machine-to-Machine, M2M, domain, said method providing for unique identification of application instances within the M2M domain and comprising:
   obtaining an application identifier for an application instance, in association with registration of the application instance at the SCL;
   generating an application instance identifier that is globally unique within the M2M domain, based on the received application identifier, an SCL identifier predefined for identifying the SCL within the M2M domain, and a random value;
   binding the application instance identifier to the application instance at the SCL; and
   identifying the application instance within the M2M domain via the application instance identifier.

2. The method of claim 1, wherein the application instance is an instance of a given M2M application, and wherein the application identifier is generic to any instance of that given M2M application.

3. The method of claim 1, wherein generating the application instance identifier comprises appending the SCL identifier and the random value to the application identifier, or to an alias corresponding to the application identifier.

4. The method of claim 1, wherein generating the application instance identifier comprises deriving the application instance identifier from the application identifier or a corresponding alias, the SCL identifier and the random value.

5. The method of claim 1, wherein the application instance identifier includes one or more data items received from the application instance.

6. The method of claim 5, wherein the one or more data items comprise at least one of: an equipment identifier identifying an item of equipment on which the application instance is running; and an operator identifier identifying a user of the equipment on which the application instance is running.

7. The method of claim 1, wherein identifying the application instance within the M2M domain via the application instance identifier includes using the application instance identifier to publish or otherwise announce the registration of the application instance at the SCL, to one or more other M2M entities in the M2M domain.

8. The method of claim 1, further comprising generating a new application instance identifier that is globally unique within the M2M domain, for each subsequent registration of a new application instance for any given application.

9. The method of claim 1, wherein obtaining the application identifier comprises receiving it from the application instance, in conjunction with registration of the application instance at the SCL.

10. A Machine-to-Machine, M2M, network node configured for operation in an M2M network domain, said node comprising:
   a communication interface configured to communicatively couple a Services Capability Layer, SCL, hosted by the node with one or more other M2M entities within the M2M domain; and a processing circuit operatively associated with the communication interface and configured to instantiate the SCL at the node so that the SCL provides for unique identification of application instances within the M2M domain, based on being configured to:
 obtain an application identifier for an application instanced, in association with registration of the application instance at the SCL;
 generate an application instance identifier that is globally unique within the M2M domain, based on the application identifier, an SCL identifier predefined for identifying the SCL within the M2M domain, and a random value;
 bind the application instance identifier to the application instance at the SCL; and
 identify the application instance within the M2M domain via the application instance identifier.

11. The node of claim 10, wherein the application instance is an instance of a given M2M application, and wherein the application identifier is generic to any instance of that given M2M application.

12. The node of claim 10, wherein the processing circuit is configured to generate the application instance identifier by appending the SCL identifier and the random value to the application identifier, or to an alias corresponding to the application identifier.

13. The node of claim 10, wherein the processing circuit is configured to generate the application instance identifier by deriving the application instance identifier from the application identifier or a corresponding alias, the SCL identifier and the random value.

14. The node of claim 10, wherein the processing circuit is configured to include in the application instance identifier one or more data items that were received from the application instance.

15. The node of claim 14, wherein the one or more data items comprise at least one of: an equipment identifier identifying an item of equipment on which the application instance is running; and an operator identifier identifying a user of the equipment on which the application instance is running.

16. The node of claim 10, wherein the processing circuit is configured to identify the application instance within the M2M domain via the application instance identifier by using the application instance identifier to publish or otherwise announce the registration of the application instance at the SCL, to one or more other M2M entities in the M2M domain.

17. The node of claim 10, wherein the processing circuit is configured to generate a new application instance identifier that is globally unique within the M2M domain, for each subsequent registration of a new application instance for any given application.

* * * * *